(12) United States Patent
Yamazaki

(10) Patent No.: US 7,916,130 A0
(45) Date of Patent: Mar. 29, 2011

(54) ELECTRONIC DEVICE WITH LIQUID CRYSTAL DISPLAY

(75) Inventor: Shunpei Yamazaki, Setagaya (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 10/989,361

(22) Filed: Nov. 17, 2004

(65) Prior Publication Data

US 2005/0088403 A1    Apr. 28, 2005

Related U.S. Application Data

(62) Division of application No. 09/385,020, filed on Aug. 30, 1999.

(30) Foreign Application Priority Data

Sep. 3, 1998    (JP) .................................. 10-248931

(51) Int. Cl.
   *G09G 5/00*    (2006.01)
   *G09G 3/36*    (2006.01)
(52) U.S. Cl. ............. 345/206; 345/102; 345/92; 349/45
(58) Field of Classification Search .................... 345/80, 345/92, 102, 100, 206, 87; 349/149, 152, 349/45, 64, 112, 106, 69, 61; 362/30; 313/498, 313/486; 257/461, 607
See application file for complete search history.

(56) References Cited

U.S. PATENT DOCUMENTS

| 4,822,145 | A |   | 4/1989  | Staelin |
| 4,963,859 | A |   | 10/1990 | Parks |
| 4,978,952 | A |   | 12/1990 | Irwin |
| 5,206,749 | A | * | 4/1993  | Zavracky et al. ............... 349/45 |

(Continued)

FOREIGN PATENT DOCUMENTS

DE    41 32 557 A1    7/1993

(Continued)

OTHER PUBLICATIONS

"Full Color Liquid Crystal Display in a Field Sequential Utilizing a High Speed Response Characteristics of OCB Liquid Crystal," Miyashita et al., Liquid Crystal Society: LCD Forum Sponsorship, 1998, pp. 7-15.

(Continued)

*Primary Examiner* — Kevin M Nguyen
(74) *Attorney, Agent, or Firm* — Eric J. Robinson; Robinson Intellectual Property Law Office, P.C.

(57) ABSTRACT

An electronic device, such as personal computer, incorporating a liquid crystal panel which uses LEDs as an illuminating light source for a liquid crystal panel to reduce power consumption and size of the electronic device. When 3-color LED lamps 13R, 13G, 13B of the LED light source 12 are lit, red, green and blue rays emitted from respective LED lamps enter the scatterplate 11 where they are scattered and mixed to produce white light LW which goes out from the entire surface of the scatterplate 11 to illuminate the entire rear surface of the transmission type liquid crystal panel 10. The white light LW that has entered the liquid crystal panel 10 is modulated according to the alignment of the liquid crystal material and passes through the color filters of the counter substrate. The user can view the transmitted light LT from the liquid crystal panel 10 as a color image.

61 Claims, 6 Drawing Sheets

U.S. PATENT DOCUMENTS

| Patent | Type | Date | Inventor | Ref |
|---|---|---|---|---|
| 5,231,265 | A | 7/1993 | McCleer et al. | |
| 5,279,292 | A | 1/1994 | Baumann et al. | |
| 5,287,205 | A | 2/1994 | Yamazaki et al. | |
| 5,334,993 | A | 8/1994 | Okajima et al. | |
| 5,341,231 | A | 8/1994 | Yamamoto et al. | |
| 5,375,043 | A | 12/1994 | Tokunaga | |
| 5,506,598 | A * | 4/1996 | Shimada et al. | 345/92 |
| 5,532,854 | A | 7/1996 | Fergason | |
| 5,608,550 | A | 3/1997 | Epstein et al. | |
| 5,702,431 | A | 12/1997 | Wang et al. | |
| 5,738,731 | A | 4/1998 | Shindo et al. | |
| 5,751,383 | A | 5/1998 | Yamanaka | |
| 5,757,348 | A | 5/1998 | Handschy et al. | |
| 5,777,594 | A | 7/1998 | Miyawaki | |
| 5,828,429 | A * | 10/1998 | Takemura | 349/42 |
| 5,890,790 | A | 4/1999 | Osawa | |
| 5,894,539 | A | 4/1999 | Epstein | |
| 5,896,119 | A | 4/1999 | Evanicky et al. | |
| 5,923,311 | A * | 7/1999 | Edwards | 345/92 |
| 5,926,240 | A | 7/1999 | Hirota et al. | |
| 5,929,951 | A * | 7/1999 | Sasakura et al. | 349/62 |
| 5,953,469 | A | 9/1999 | Zhou | |
| 5,999,282 | A | 12/1999 | Suzuki et al. | |
| 6,007,209 | A * | 12/1999 | Pelka | 362/30 |
| 6,025,252 | A | 2/2000 | Shindo et al. | |
| 6,025,894 | A * | 2/2000 | Shirasaki et al. | 349/69 |
| 6,069,440 | A * | 5/2000 | Shimizu et al. | 313/486 |
| 6,073,034 | A | 6/2000 | Jacobsen et al. | |
| RE36,792 | E | 7/2000 | Sonehara | |
| 6,106,734 | A | 8/2000 | Shindo et al. | |
| 6,115,016 | A | 9/2000 | Yoshihara et al. | |
| 6,124,911 | A | 9/2000 | Nakamura et al. | |
| 6,137,120 | A | 10/2000 | Shindo et al. | |
| 6,166,787 | A | 12/2000 | Akins et al. | |
| 6,177,706 | B1 | 1/2001 | Shindo et al. | |
| 6,181,311 | B1 | 1/2001 | Hashimoto | |
| 6,219,116 | B1 | 4/2001 | Yuuki et al. | |
| 6,225,668 | B1 | 5/2001 | Shindo et al. | |
| 6,243,068 | B1 | 6/2001 | Evanicky et al. | |
| 6,243,069 | B1 | 6/2001 | Ogawa et al. | |
| 6,266,108 | B1 | 7/2001 | Bao et al. | |
| 6,281,867 | B2 | 8/2001 | Kurematsu et al. | |
| 6,304,243 | B1 | 10/2001 | Kondo et al. | |
| 6,326,981 | B1 | 12/2001 | Mori et al. | |
| 6,337,536 | B1 * | 1/2002 | Matsubara et al. | 313/498 |
| 6,340,824 | B1 | 1/2002 | Komoto et al. | |
| 6,384,818 | B1 * | 5/2002 | Yamazaki et al. | 345/206 |
| 6,586,874 | B1 | 7/2003 | Komoto et al. | |
| 6,597,076 | B2 | 7/2003 | Scheible et al. | |
| 6,651,999 | B1 | 11/2003 | Fischer et al. | |
| 6,677,214 | B1 | 1/2004 | Shindo et al. | |
| 6,803,886 | B2 | 10/2004 | Kondo et al. | |
| 6,819,376 | B1 * | 11/2004 | Muramatsu | 349/110 |
| 2002/0154518 | A1 | 10/2002 | Elferich et al. | |
| 2009/0046218 | A1 | 2/2009 | Yamazaki | |
| 2009/0058795 | A1 | 3/2009 | Yamazaki | |

FOREIGN PATENT DOCUMENTS

| | | |
|---|---|---|
| DE | 41 04 359 A1 | 1/1994 |
| DE | 196 17 102 A1 | 10/1997 |
| DE | 199 15 487 C1 | 11/2000 |
| DE | 101 19 283 A1 | 10/2002 |
| DE | 199 46 934 A1 | 11/2003 |
| EP | 0 507 639 | 10/1992 |
| EP | 0 545 705 | 6/1993 |
| EP | 0 593 266 | 4/1994 |
| EP | 0 659 910 | 6/1995 |
| JP | 0 5-158033 | 6/1993 |
| JP | 05-289076 | 11/1993 |
| JP | 07-020985 | 1/1995 |
| JP | 07-191311 | 7/1995 |
| JP | 07-239482 | 9/1995 |
| JP | 07-253853 | 10/1995 |
| JP | 07-301714 | 11/1995 |
| JP | 08-050291 | 2/1996 |
| JP | 08-211361 * | 8/1996 |
| JP | 08211361 A * | 8/1996 |
| JP | 09-146089 | 6/1997 |
| JP | 09-172201 | 6/1997 |
| JP | 09-230342 | 9/1997 |
| JP | 10-063204 | 3/1998 |
| JP | 10-161113 | 6/1998 |
| JP | 10-161123 | 6/1998 |
| JP | 10-221692 | 8/1998 |
| JP | 2002-1 98 873 A | 7/2002 |

OTHER PUBLICATIONS

"Field Sequential Full Color LCD," Okita, M., Monthly Display, Jul. 1998, Separate Edition, pp. 11-16 and News Flash.

European Patent Office, Search Report, Mar. 8, 2001, 3 pages.

Tatsuaki Funamoto et al., "A Front-lighting System Utilizing A Thin Light Guide," Asia Display, 1998, pp. 897-900.

H. J. Cornelissen et al., "Frontlights for Reflective LCDs Based on Lightguides with Micro-Grooves," SID 99 Digest, 1999, pp. 912-915.

Tai et al., "24.1: A Transparent Frontlighting System for Reflective-Type Displays," pp. 375-378, 1995, SID Digest.

Howard et al., "37.2: Gyricon Electric Paper," pp. 1010-1013, 1998, SID Digest.

Nakamura et al., "37.3: Development of Electrophoretic Display Using Microcapsulated Suspension," pp. 1014-1017, 1998, SID Digest.

Bryning et al., "37.4: Reverse-Emulsion Electrophoretic Display (REED)," pp. 1018-1021, 1998, SID Digest.

A. Tanaka, "Trends of Backlighting and Frontlighting Systems for LCD," pp. 347-350, 1998, Fujitsu Kasei Limited Planning and Development Division.

European Search Report of Jun. 30, 2005 for EP Application No. 05 012 260.5.

Office Action (European Application No. 05012260.5) dated Nov. 5, 2007.

Office Action (Application No. 05012260.5) Dated Oct. 10, 2008.

"Full Color Liquid Crystal Display in a Field Sequential Utilizing a High Speed Response Characteristics of OCB Liquid Crystal," Miyashita et al., Liquid Crystal Society: LCD Forum Sponsorship, 1998, pp. 7-15.

"Field Sequential Full Color LCD," Okita, M., Monthly Display, Jul. 1998, Separate Edition, pp. 11-16 and NEWS FLASH.

European Patent Office, Search Report, Mar. 8, 2001, 3 pages.

Tatsuaki Funamoto et al., "A Front-lighting System Utilizing a Thin Light Guide," ASIA DISPLAY, 1998, pp. 897-900.

H. J. Cornelissen et al., "Frontlights for Reflective LCDs Based on Lightguides with Micro-Grooves," SID 99 Digest, 1999, pp. 912-915.

Tai et al., "24.1: A Transparent Frontlighting System for Reflective-Type Displays," pp. 375-378, 1995, SID Digest.

Howard et al., "37.2: Gyricon Electric Paper," pp. 1010-1013, 1998, SID Digest.

Nakamura et al., "37.3: Development of Electrophoretic Display Using Microcapsulated Suspension," pp. 1014-1017, 1998, SID Digest.

Bryning et al., "37.4: Reverse-Emulsion Electrophoretic Display (Reed)," pp. 10181021, 1998, SID Digest.

A. Tanaka, "Trends of Backlighting and Frontlighting Systems for LCD," pp. 347-350, 1998, Fujitsu Kasei Limited Planning and Development Division.

Office Action (U.S. Appl. No. 12/249,260) dated Jun. 18, 2010.

* cited by examiner

ELECTRONIC DEVICE WITH LIQUID CRYSTAL DISPLAY

BACKGROUND OF THE INVENTION

1. Field of the Invention

The present invention relates to electronic apparatus with a direct-viewing type liquid crystal panel which uses a light emitting diode (LED) as an illumination source for the liquid crystal panel.

The electronic apparatus of the invention include information processing devices, such as note or laptop personal computers and mobile computers, head-mounted displays, video cameras, digital still cameras, car navigation systems, and cellular phones.

2. Description of Related Art

In recent years, research and development have been conducted on the liquid crystal panel production technology and resulted in a relatively inexpensive price of the liquid crystal panel. Further, as the information society has progressed in the filed of the Internet and electronic mail, the note type personal computers (hereinafter referred to as note type PCs) have rapidly prevailed.

The digital still cameras and video cameras incorporate a liquid crystal panel so that a photographed picture can be viewed on the site. Because of this advantage, these cameras have gained popularity with consumers.

There are two types of liquid crystal panel: a transmission type and a reflection type. The transmission type liquid crystal panel has a backlight installed at the back of the panel whose illumination light passes through the liquid crystal panel to form an image on the display that can be seen by the user. The reflection type liquid crystal panel, on the other hand, does not require a backlight and forms an image by reflecting external light by the liquid crystal panel. The display quality of the reflection type, however, does not match that of the transmission type.

Because the note PCs and digital cameras are used for displaying Internet home pages in color, importance is placed on the display quality such as color reproducibility and the liquid crystal panel for use with these electronic devices needs to be of a transmission type.

Generally, the backlight source for the transmission type liquid crystal panel uses a cold cathode tube that emits white rays. The cold cathode tube is a fluorescent lamp and thus requires a high-voltage AC power supply to be turned on. Hence, the electronic devices such as note PCs require a DC-AC converter for converting a DC power supply into an AC power supply of several hundred volt.

At present, essential factors in improving the portability of electronic devices are reductions in power consumption, size and weight. Although the power consumption of the liquid crystal panel itself is small, the use of a backlight of a conventional cold cathode tube requires a high voltage, which hinders the reduction in power consumption. Another drawback is that the cold cathode tube has a short life time of about 2,000 hours.

SUMMARY OF THE INVENTION

The present invention has been accomplished in light of the problems described above and provides electronic devices incorporating a liquid crystal panel that has overcome the drawbacks of high power consumption and short longevity (life) of the light source.

In the information device incorporating a liquid crystal panel that overcomes the aforementioned drawbacks, the illuminating light source for the liquid crystal panel comprises:
3-color light emitting diodes for producing three primary colors for additive color mixing; and
a means for mixing rays from the three-color LEDs to produce white light.

In this embodiment, the use of LEDs as a light source for illuminating the liquid crystal panel makes it possible to easily reduce power consumption and size of the electronic device such as a note PC.

LED is a solid element using the photoelectric conversion effect of a semiconductor. Illuminating an LED requires application of DC voltage of about 1.5 V and thus eliminates the need for the conventional DC-AC converter, which in turn results in a significant reduction in power consumption. The LED is a semiconductor device and thus more reliable and has a smaller size and a longer life than the cold cathode tube.

In the construction described above, the 3-color LEDs for generating three primary colors for additive color mixing—typically red, green and blue LEDs—emit color rays of light which are mixed to produce white light that in turn is used for illuminating the liquid crystal panel.

DESCRIPTION OF THE PREFERRED EMBODIMENTS

The invention will be described by referring to FIGS. 1 to 7.

Embodiment 1

Figure 2:
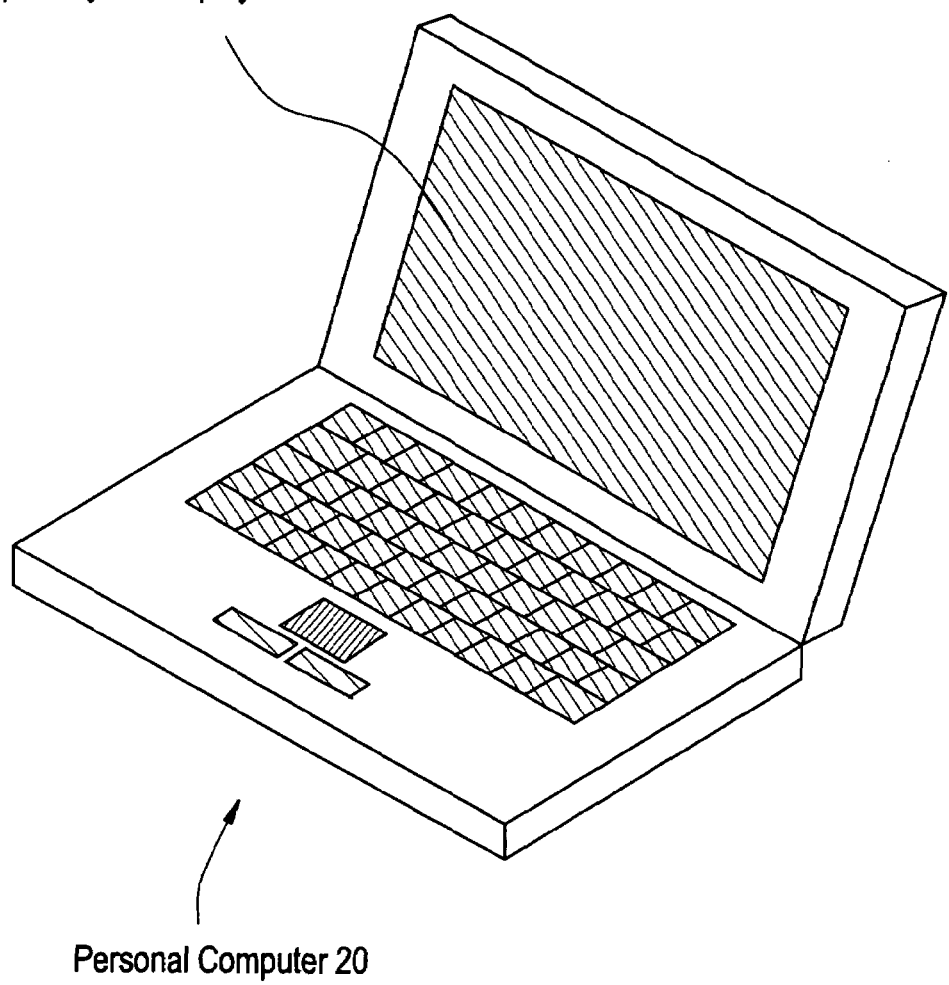
FIG. 2 is an external perspective view of a note PC.

This embodiment represents an example in which the present invention is applied to a note PC (personal computer) incorporating a liquid crystal display. FIG. 2 shows a rough external perspective view of a note PC 20 which has a liquid crystal display 21 using a color display as a display means.

Figure 1A:
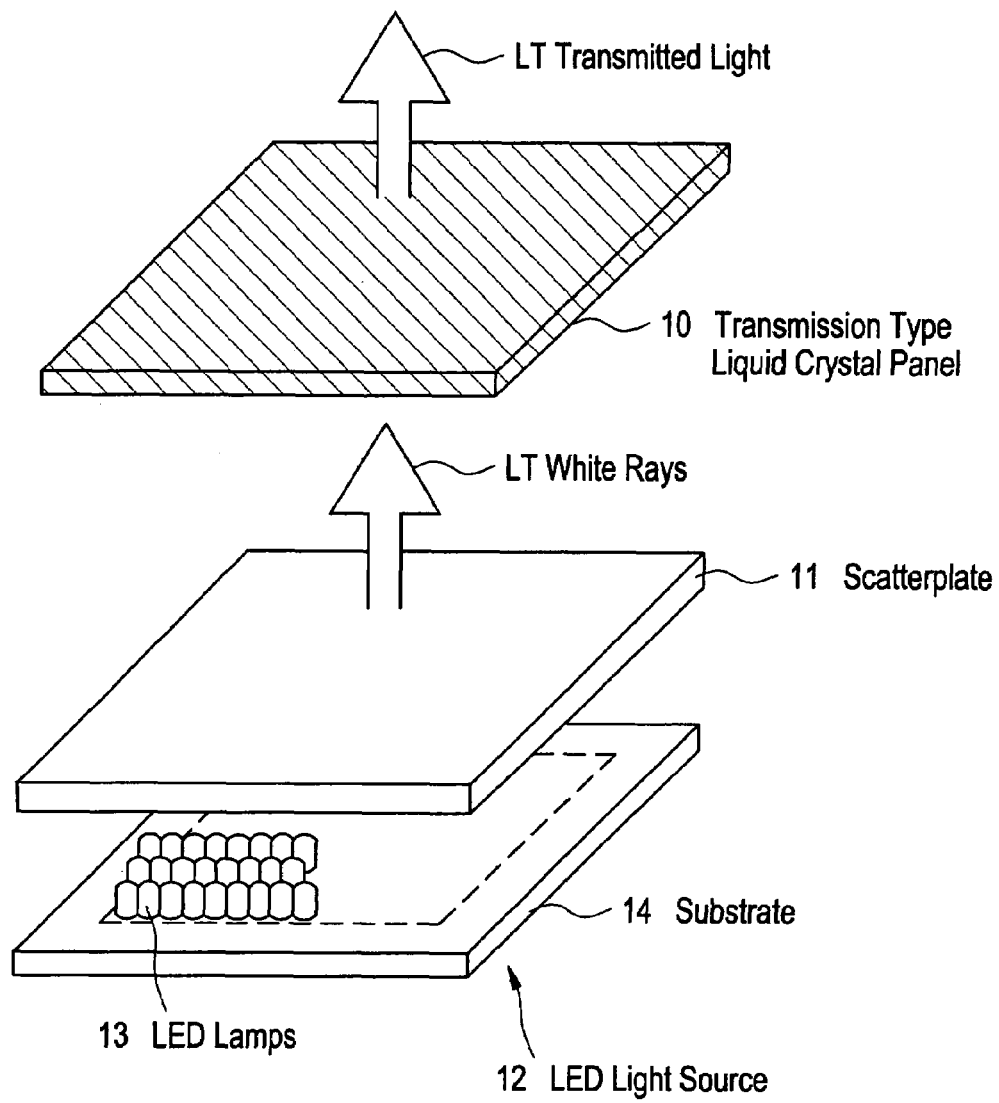
FIG. 1(A) is an exploded perspective view of an essential part of a transmission type liquid crystal display.

FIG. 1(A) is an exploded perspective view of a main portion of the liquid crystal display 21 which has a scatterplate 11 and an LED light source 12 arranged in that order behind a transmission type liquid crystal panel 10.

Figure 1B:
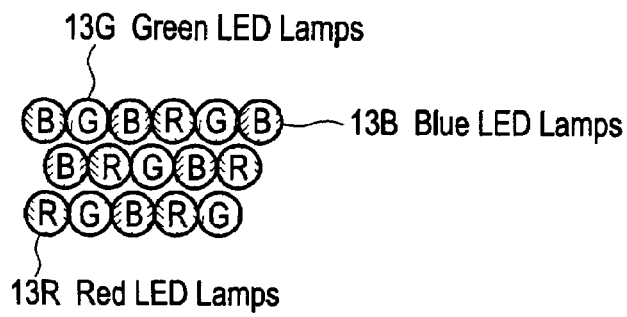
FIG. 1(B) is a plan view partially showing a LED light source.

As an illumination light source for the transmission type liquid crystal panel 10 an LED light source 12 is used. The LED light source 12 has LED lamps 13 arranged two dimensionally on a substrate 14. In this embodiment, as shown in FIG. 1(B), LED lamps of three colors—red LED lamps 13R, green LED lamps 13G and blue lamps 13B—are used. FIG. 1(B) is a partial top view of the LED lamps 13, showing the arrangement of the LED lamps 13 on the substrate 14. The three-color LED lamps 13R, 13G, 13B are arranged in delta for uniform distribution over the substrate 14.

The scatterplate 11 is made of a material transparent to a visible light, such as acrylic, polycarbonate and glass. The scatterplate 11 may be formed at its side surface with a reflection plate.

Figure 3:
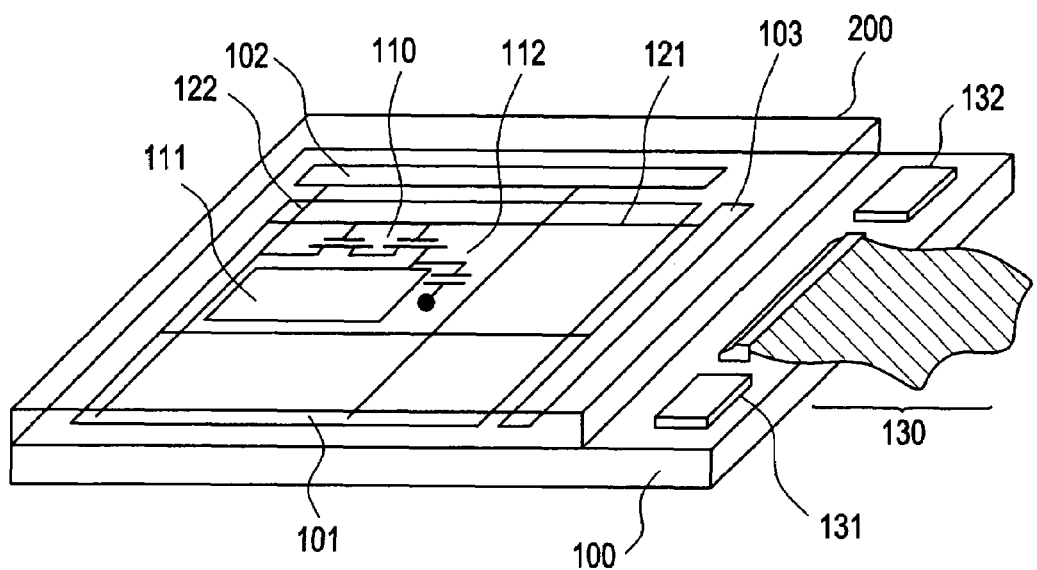
FIG. 3 is a schematic view showing the construction of the liquid crystal panel.

FIG. 3 shows an outline construction of the transmission type liquid crystal panel 10. An active matrix substrate comprises a pixel matrix circuit 101, a scan line drive circuit 102 and a signal line drive circuit 103, all formed on a glass substrate 100. The scan line drive circuit 102 and the signal line drive circuit 103 are connected to the pixel matrix circuit 101 through scan lines 121 and signal lines 122. These drive circuits 102, 103 are formed mainly of CMOS circuits.

The scan line 121 is formed for each row of the pixel matrix circuit 101 and the signal line 122 is formed for each column of the pixel matrix circuit 101. Near the intersections of the scan lines 121 and the signal lines 122, pixel TFTs 110 connected to the scan lines 121 and the signal lines 122 are formed. The pixel TFTs 110 are each connected with a pixel electrode 111 and a capacitor 112.

An active matrix substrate and a counter substrate 200 are bonded together with a liquid crystal sealed between them. The active matrix substrate is formed with external terminals of TFTs during the manufacturing process, and the portions of the active matrix substrate that are formed with the external terminals are not opposed to the counter substrate 200. The external terminals are connected with an FPC (flexible printed circuit) 130, through which external signals and power supply are fed to the circuits 101-103.

The counter substrate 200 is formed with color filters at portions facing the pixel matrix circuits, and the color filters are formed with a transparent conductive film such as ITO film over the entire glass substrate. The transparent conductive film is a counter electrode facing the pixel electrode 111 of the pixel matrix circuit 101. An electric field produced between the pixel electrode 111 and the counter electrode drives the liquid crystal material.

The active matrix substrate has IC chips 131, 132 at the FPC 130 mounting surface. These IC chips are formed with a video signal processing circuit, a timing pulse generation circuit, a correction circuit, a memory circuit, a calculation circuit and others. Although two IC chips are shown in FIG. 3, it is possible to use one IC chip or three or more IC chips.

In operating the liquid crystal display 21, the three-color LED lamps 13R, 13G, 13B of the LED light source 12 are illuminated. The red, green and blue rays emitted from the respective LED lamps enter the scatterplate 11 where they are scattered and mixed to form white rays LW that go out from the entire surface of the scatterplate 11. The white rays LW illuminate the whole back of the transmission type liquid crystal panel 10.

The white rays LW entering the transmission type liquid crystal panel 10 are modified according to the orientation of the liquid crystal material and pass through the color filters of the counter substrate. The PC user can recognize the transmitted light LT from the liquid crystal panel 10 as a color image.

Embodiment 2

In the embodiment 1, color filters are used to produce color images, and three-color LED lamps 13R, 13G, 13B are illuminated simultaneously to produce white light. In this embodiment 2, color images are made without using color filters.

One frame of a color image is divided into three sub-frames. Red, blue and green image data are successively written into the pixel electrodes in the active matrix substrate. Then, in synchronism with the writing of red, blue and green image data, the LED lamps 13R, 13B, 13G are controlled to be turned on. That is, while the red data is written, only the red LED lamp 13R is lighted and a red image is displayed on the liquid crystal panel 10.

In general, when the frequency of one frame is 60 Hz, the sub-frame frequency is 180 Hz. At this frequency a red image, a green image and a blue image are successively displayed. These red, green and blue images are combined on the retina of the user of PC 10 and recognized as a color image.

To drive the liquid crystal at a speed as high as 180 Hz, a ferroelectric liquid crystal material is appropriate for use with the liquid crystal material. When a nematic liquid crystal is used, it must be aligned in an optically compensated bend (OCB) mode.

Embodiment 3

This embodiment is a variation of the embodiment 1. While in the embodiment 1 the transmission type liquid crystal panel is mounted on a note PC, this embodiment 3 describes an example of a note PC using a reflection type liquid crystal panel. The external view of the note PC is shown in FIG. 2.

The reflection type liquid crystal panel does not require a backlight and therefore has the advantages of light weight and low power consumption. However, because external light is used, the display is hard to see in a dark place. This embodiment is intended to improve this drawback.

Figure 4A:
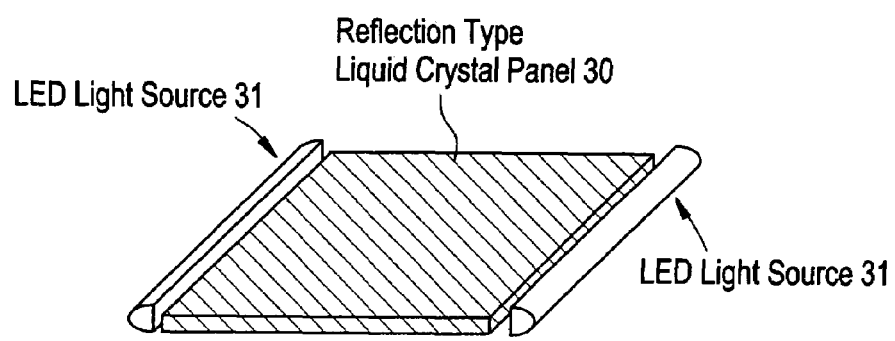
FIG. 4(A) is a schematic view showing the construction of a main part of a reflection type liquid crystal display.

FIG. 4(A) shows the construction of the main part of the liquid crystal panel 10 of this embodiment. At the opposing sides of a reflection type liquid crystal panel 30 are arranged LED light sources 31, which illuminate the reflection type liquid crystal panel 30 so that the display can be seen even in a dark place.

Figure 4B:
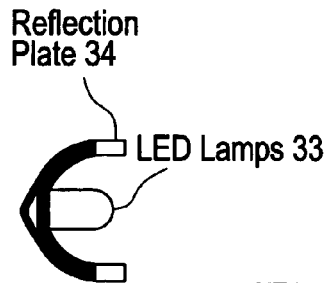
FIGS. 4(B) to 4(E) are views for explaining a LED light source.
Figure 4C:
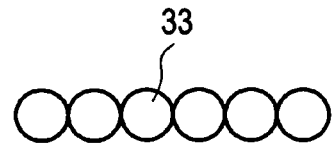

By referring to FIGS. 4(B) to 4(D), the construction of the LED light sources 31 will be explained. As shown in FIGS. 4(B) and 4(C), the LED light sources 31 have a first-dimensionally arranged LED lamps 33 and a reflection plate 34 arranged at the back of the LED lamps 33.

Figure 4D:
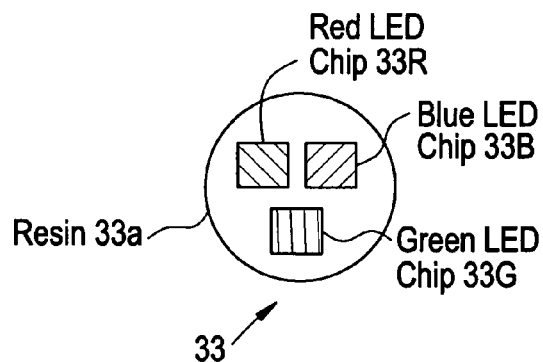

As shown in FIG. 4(D), the LED lamp 33 comprises a red LED chip 33R, a green LED chip 33G and a blue LED chip 33B arranged on a substrate, with the surface of these chips coated with resin 33a. The surface of the resin 33a is frosted.

Figure 4E:
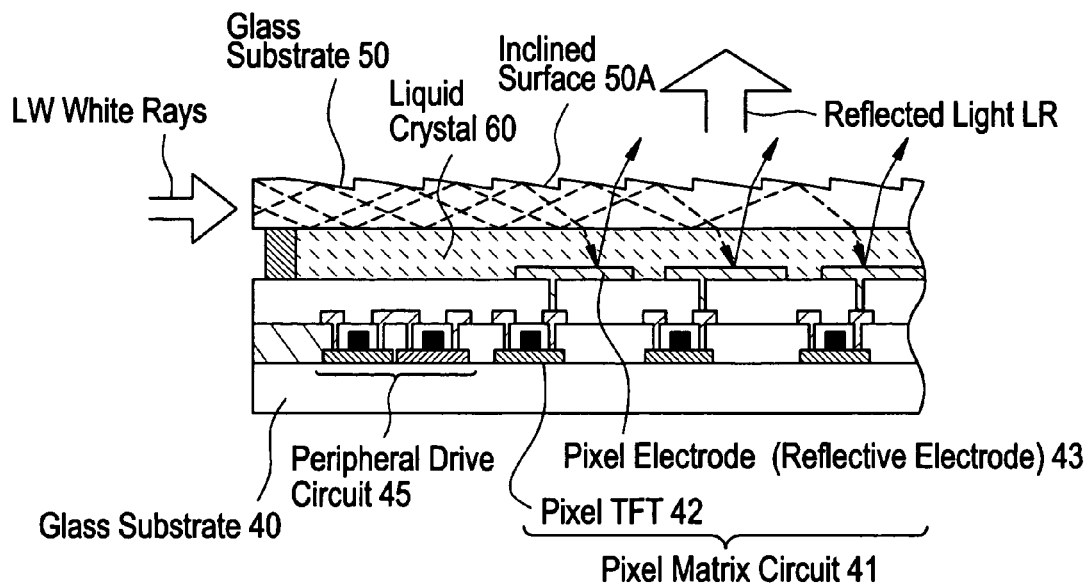

The function of the LED light sources 31 will be explained by referring to FIG. 4(E). FIG. 4(E) shows an outline cross section of the reflection type liquid crystal panel 30. The construction of the reflection type liquid crystal panel 30 is as shown in FIG. 3 and a liquid crystal 60 is sealed between glass substrates 40 and 50. The glass substrate 40 on the side of the active matrix substrate is formed with a pixel matrix circuit 41 and a peripheral drive circuit 45.

The pixel matrix circuit 41 is formed with pixel TFTs 42 and pixel electrodes (reflective electrodes) 43 made of metal material. The peripheral drive circuit 45 is formed mainly of CMOS circuits.

On the back of the glass substrate 50 on the counter substrate side are formed triangular wave-shaped inclined surfaces 50a. On the opposite side are formed color filters and counter electrodes.

When an image on the reflection type liquid crystal panel 30 is to be checked in a dark place, the LED lamps 33 of the LED light sources 31 are turned on. The red, blue and green 3-color LED chips 33R, 33G, 33B of the LED lamps 33 are applied with voltages to emit light. Light rays of red, blue and green colors emitted from the LED chips 33R, 33B, 33G are randomly scattered and mixed to form white light LW that goes out from the LED lamps 33.

The white light LW directly emitted from the LED lamps 33 or reflected by the reflection plate 34 enters the glass substrate 50 on the counter substrate side from its side. Because of the inclined surfaces 50a formed at the back of the glass substrate 50, the white light LW repeats being reflected as it propagates through the glass substrate 50 toward the inner part of the panel 30. The light that has entered is reflected by the reflection electrodes 43, passes through the glass substrate 50, and leaves the liquid crystal panel. The reflected light LR that has penetrated the glass substrate 50 is recognized as a color image by the PC user because it was modified when passing through the liquid crystal.

Figure 5A:
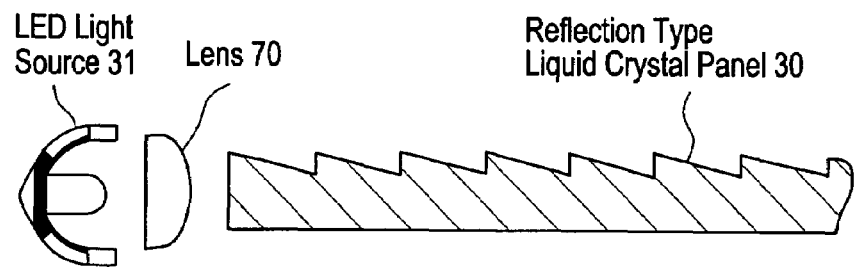
FIGS. 5(A) and 5(B) are schematic diagrams showing the arrangement of the liquid crystal panel and the LED light source.
Figure 5B:
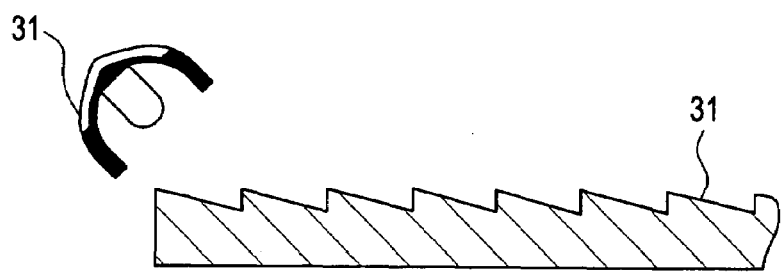
Figure 6A:
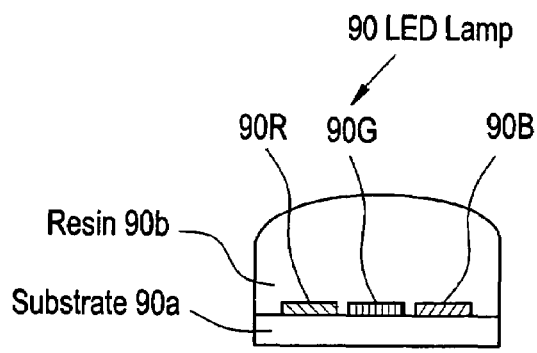
FIGS. 6(A) and 6(B) are schematic diagrams showing the construction of the LED light source.
Figure 6B:
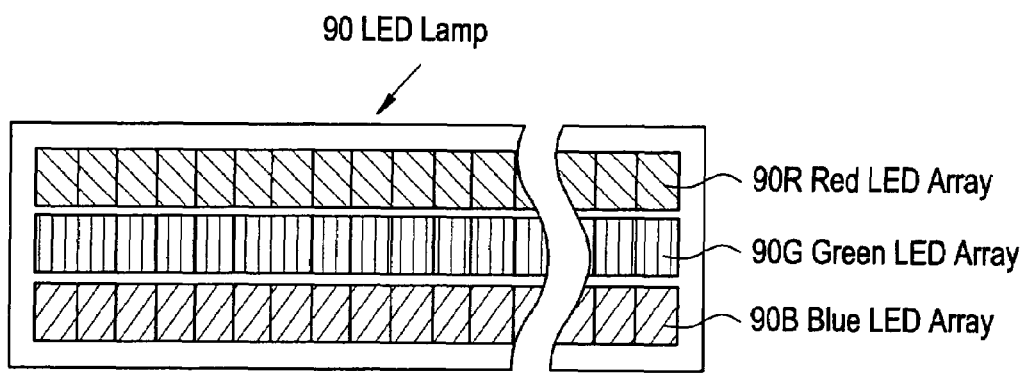

To ensure that the white light LW can enter the glass substrate 50 efficiently, it may be collected by a lens 70 such as a cylindrical lens before entering the liquid crystal panel 30, as shown in FIG. 5(A).

Rather than arranging the LED light sources 31 horizontally with respect to the liquid crystal panel 30, they may be arranged diagonally above the panel to throw the white light LW onto the back (the surface formed with the inclined surfaces 50a) of the glass substrate 50. In this case, too, the lens 70 may be provided as shown in FIG. 5(A).

While this embodiment provides two LED light sources 31, only one light source may be used. It is also possible to arrange three or four LED light sources to encircle the liquid crystal panel 30.

Embodiment 4

Although the reflection type liquid crystal panel of the embodiment 3 is shown to use color filters to display a color image, it is also possible, as in the embodiment 2, to display a color image by the reflection type liquid crystal panel without using the color filters.

In this case, red, blue and green LEDs are turned on in succession. Instead of using the LED lamps 33 of FIG. 4, an LED lamp 90 shown in FIG. 6 may preferably be used. The LED lamp 90 in this embodiment has a red LED array 90R, a green LED array 90G and a blue LED array 90B arranged on a substrate 90a and coated with resin 90b.

The LED arrays 90R, 90G, 90B can be turned on independently. At the timing that red, green and blue image data are written into the pixel electrodes, the corresponding color LED arrays can be turned on.

Embodiment 5

The CMOS circuits and pixel matrix circuits formed according to the invention can be used on a variety of electro-optical devices (active matrix type liquid crystal displays). That is, this invention can be applied to all electronic devices incorporating these direct-viewing type liquid crystal panels.

Such electronic devices include video cameras, digital cameras, head mounted displays (goggle type displays), car navigation equipment, personal computers and mobile information terminals (mobile computers, cellular phones or electronic books). Such examples are shown in FIGS. 7(A) to 7(F).

Figure 7A:
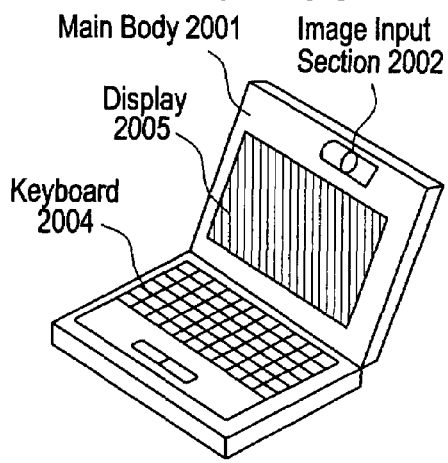
FIGS. 7(A) to 7(F) are external views showing examples of electronic devices.

FIG. 7(A) shows a personal computer, which comprises a body 2001, an image input section 2002, a display 2003 and a keyboard 2004. This invention can be applied to the image input section 2002, the display 2003 and other signal control circuits.

Figure 7B:
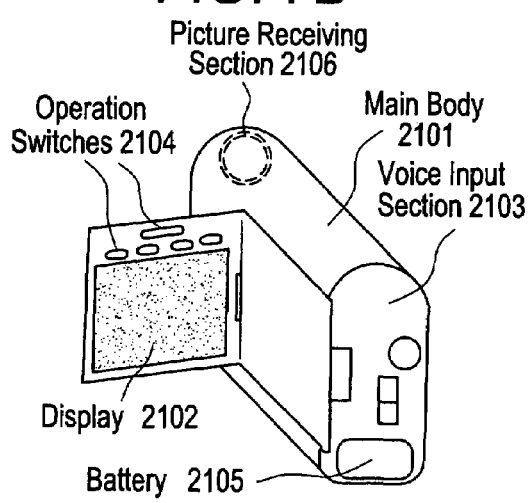

FIG. 7(B) shows a video camera, which comprises a body 2101, a display 2102, a voice input section 2103, operation switches 2104, a battery 2105 and a picture receiving section 2106. This invention can be applied to the display 2102, a voice input section 2103 and other signal control circuits.

Figure 7C:
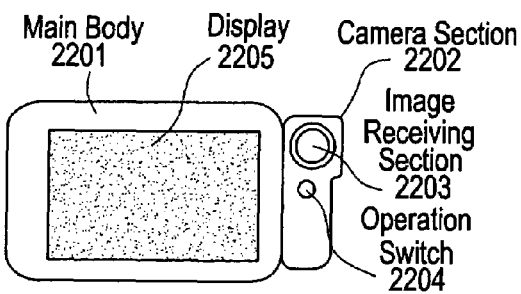

FIG. 7(C) shows a mobile computer, which comprises a body 2201, a camera section 2202, an image receiving section 2203, an operation switch 2204 and a display 2205. This invention can be applied to the display 2205 and other signal control circuits.

Figure 7D:
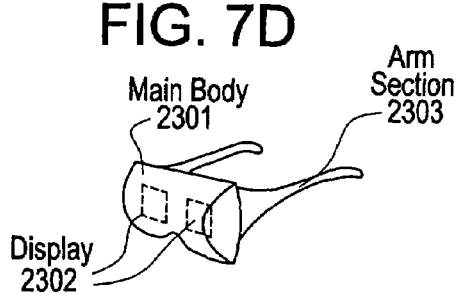

FIG. 7(D) shows a goggle type display, which comprises a body 2301, a display 2302 and an arm section 2303. This invention can be applied to the display 2302 and other signal control circuits.

Figure 7E:
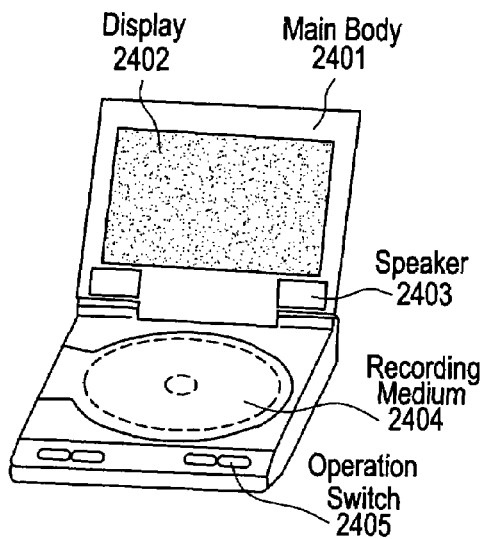

FIG. 7(E) shows a player using a recording medium containing programs, which comprises a body 2401, a display 2402, a speaker 2403, a recording medium 2404, and an operation switch 2405. This device can use DVD (digital versatile disc), CD and others as a recording medium and allows the user to listen music, see movie and perform games and Internet. This invention can be applied to the display 2402 and other signal control circuit.

Figure 7F:
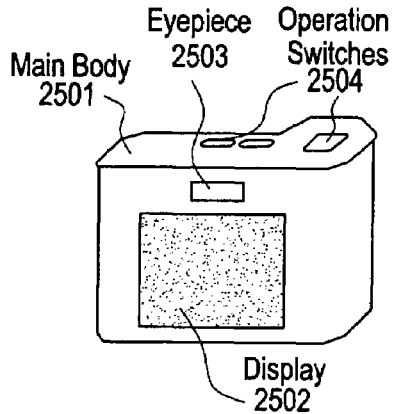

FIG. 7(F) shows a digital camera, which comprises a body 2501, a display 2502, an eyepiece 2503, operation switches 2504 and an image receiving section (not shown). This invention can be applied to the display 2502 and other signal control circuits.

As described above, the range of application of this invention is very wide, including electronic devices in various fields which incorporate the direct-viewing type liquid crystal display. These electronic devices can be implemented by using any combination of the above embodiments 1 to 4.

The use of the LEDs as an illuminating light source for the liquid crystal panel can eliminate the drawbacks of a backlight using a conventional cold cathode tube, such as high power consumption and short life of the light source, and offer reduced power consumption and longer life.

What is claimed is:
1. A liquid crystal display device comprising:
   a liquid crystal panel comprising:
      a first substrate;
      a pixel matrix circuit over the first substrate, the pixel matrix circuit comprising:
         a thin film transistor over the first substrate, having a first gate electrode;
         a pixel electrode;
         a signal line, wherein the thin film transistor is electrically connected between the pixel electrode and the signal line; and
         a gate line electrically connected to the first gate electrode; and
      a liquid crystal over the pixel matrix circuit; and
   a backlight adjacent to the liquid crystal panel with a scatterplate interposed therebetween,
   wherein the backlight comprises a plurality of LED lamps,
   wherein each of the plurality of LED lamps comprises a second substrate, an LED provided over the second substrate, and a resin covering the plural LEDs,
   wherein the resin is provided over the second substrate,
   wherein the resin has a curved upper surface,
   wherein the plurality of LED lamps is configured so as to be controlled in accordance with input of image data to the liquid crystal panel, and wherein an insulating film is provided over the first thin film transistor and wherein the pixel electrode and the liquid crystal are provided over the insulating film.

2. An electronic device comprising the liquid crystal display device according to claim 1, wherein the electronic device is selected from the group consisting of a digital camera, a car navigation system, a personal computer, a mobile information terminal, and a cellular phone.

3. The liquid crystal display device according to claim 1, wherein the scatterplate comprises acrylic resin.

4. The liquid crystal display device according to claim 1, wherein the scatterplate comprises polycarbonate.

5. The liquid crystal display device according to claim 1, wherein the scatterplate has a reflection portion on a side surface.

6. The liquid crystal display device according to claim 1, wherein the plurality of LED lamps comprises a uniform arrangement.

7. The liquid crystal display device according to claim 1, wherein the plural LEDs comprise a red LED, a green LED and a blue LED.

8. The liquid crystal display device according to claim 1, wherein the pixel matrix circuit further comprises: a drive circuit comprising a driver transistor; and
 a second thin film transistor over the first substrate, having a second gate electrode,
 wherein the liquid crystal panel comprises a plurality of color filters over the liquid crystal,
 wherein the second thin film transistor is electrically connected between the first thin film transistor and the signal line,
 wherein the second gate electrode is electrically connected to the gate line, and
 wherein the first thin film transistor and the second thin film transistor have the same conductive type.

9. The liquid crystal display device according to claim 1, wherein the plural LEDs are plural LED chips.

10. The liquid crystal display device according to claim 1, wherein the plurality of LED lamps is configured so as to be controlled to be turned on in synchronism with the input of image data to the liquid crystal panel.

11. An electronic device comprising the liquid crystal display device according to claim 1 and at least one selected from the group consisting of a speaker, an operation switch, and a recording medium.

12. The liquid crystal display device according to claim 1, wherein the plural LEDs are in direct contact with the second substrate.

13. The liquid crystal display device according to claim 1, wherein the resin is in direct contact with the second substrate.

14. A liquid crystal display device comprising:
 a liquid crystal panel comprising:
  a first substrate;
  a pixel matrix circuit over the first substrate, the pixel matrix circuit comprising:
   a thin film transistor over the first substrate, having a first gate electrode;
   a pixel electrode;
   a signal line, wherein the thin film transistor is electrically connected between the pixel electrode and the signal line; and
   a gate line electrically connected to the first gate electrode; and
  a liquid crystal over the pixel matrix circuit; and
 a backlight adjacent to the liquid crystal panel with a scatterplate interposed therebetween,
 wherein the backlight comprises a plurality of LED lamps,
 wherein each of the plurality of LED lamps comprises a second substrate, an LED provided over the second substrate, and a resin covering the LED,
 wherein the resin is provided over with the second substrate,
 wherein the resin has a dome-like shape,
 wherein the scatterplate comprises acrylic resin, and
 wherein an insulating film is provided over the thin film transistor and wherein the pixel electrode and the liquid crystal are provided over the insulating film.

15. The liquid crystal display device according to claim 14, wherein the scatterplate has a reflection portion on a side surface.

16. The liquid crystal display device according to claim 14, wherein the plurality of LED lamps comprises a uniform arrangement.

17. The liquid crystal display device accoridng to claim 14, wherein the LED is an LED chip.

18. An electronic device comprising the liquid crystal display device according to claim 14 and at least one selected from the group consisting of a speaker, an operation switch, and a recording medium.

19. The liquid crystal display device according to claim 14, wherein the LED is in direct contact with the second substrate.

20. The liquid crystal display device according to claim 14, wherein the resin is in direct contact with the second substrate.

21. A liquid crystal display device comprising:
 a liquid crystal panel comprising:
  a first substrate;
  a pixel matrix circuit over the first substrate, the pixel matrix circuit comprising:
   a thin film transistor over the first substrate, having a first gate electrode;
   a pixel electrode;
   a signal line, wherein the thin film transistor is electrically connected between the pixel electrode and the signal line; and
   a gate line electrically connected to the first gate electrode; and
  a liquid crystal over the pixel matrix circuit; and
 a backlight adjacent to the liquid crystal panel with a scatterplate interposed therebetween,
 wherein the backlight comprises a plurality of LED lamps,
 wherein each of the plurality of LED lamps comprises a second substrate, plural LEDs provided over the second substrate, and a resin covering the plural LEDs,
 wherein the resin is provided over the second substrate,
 wherein the resin has a dome-like shape, and
 wherein an insulating film is provided over the thin film transistor and wherein the pixel electrode and the liquid crystal are provided over the insulating film.

22. The liquid crystal display device according to claim 21, wherein the scatterplate comprises acrylic resin.

23. The liquid crystal display device according to claim 21, wherein the scatterplate comprises polycarbonate.

24. The liquid crystal display device according to claim 21, wherein the scatterplate has a reflection portion on a side surface.

25. The liquid crystal display device according to claim 21, wherein the plurality of LED lamps comprises a uniform arrangement.

26. The liquid crystal display device according to claim 21, wherein the plural LEDs comprise a red LED, a green LED and a blue LED.

27. The liquid crystal display device accoridng to claim 21, wherein the plural LEDs are plural LED chips.

28. An electronic device comprising the liquid crystal display device according to claim 21 and at least one selected from the group consisting of a speaker, an operation switch, and a recording medium.

29. The liquid crystal display device according to claim 21, wherein the plural LEDs are in direct contact with the second substrate.

30. The liquid crystal display device according to claim 21, wherein the resin is in direct contact with the second substrate.

31. A liquid crystal display device comprising:
 a liquid crystal panel comprising:
  a first substrate;
  a pixel matrix circuit over the first substrate, the pixel matrix circuit comprising:
   a thin film transistor over the first substrate, having a first gate electrode;
   a pixel electrode;
   a signal line, wherein the thin film transistor is electrically connected between the pixel electrode and the signal line; and
   a gate line electrically connected to the first gate electrode; and
  a liquid crystal over the pixel matrix circuit; and
 a backlight adjacent to the liquid crystal panel with a scatterplate interposed therebetween,
 wherein the backlight comprises a plurality of LED lamps,
 wherein each of the plurality of LED lamps comprises a second substrate, an LED provided over in contact with the second substrate, and a resin covering the LED,
 wherein the resin is provided over in contact with the second substrate,
 wherein the resin has a curved upper surface,
 wherein the scatterplate comprises acrylic resin, and
 wherein an insulating film is provided over the thin film transistor and wherein the pixel electrode and the liquid crystal are provided over the insulating film.

32. The liquid crystal display device according to claim 31, wherein the scatterplate has a reflection portion on a side surface.

33. The liquid crystal display device according to claim 31, wherein the plurality of LED lamps comprises a uniform arrangement.

34. The liquid crystal display device according to claim 31, wherein the LED is an LED chip.

35. An electronic device comprising the liquid crystal display device according to claim 31 and at least one selected from the group consisting of a speaker, an operation switch, and a recording medium.

36. The liquid crystal display device according to claim 31, wherein the LED is in direct contact with the second substrate.

37. The liquid crystal display device according to claim 31, wherein the resin is in direct contact with the second substrate.

38. A liquid crystal display device comprising:
 a liquid crystal panel comprising:
  a first substrate;
  a pixel matrix circuit over the first substrate, the pixel matrix circuit comprising:
   a thin film transistor over the first substrate, having a first gate electrode;
   a pixel electrode;
   a signal line, wherein the thin film transistor is electrically connected between the pixel electrode and the signal line; and
   a gate line electrically connected to the first gate electrode; and
  a liquid crystal over the pixel matrix circuit; and
 a backlight adjacent to the liquid crystal panel with a scatterplate interposed therebetween,
 wherein the backlight comprises a plurality of LED lamps,
 wherein each of the plurality of LED lamps comprises a second substrate, plural LEDs provided over the second substrate, and a resin covering the plural LEDs,
 wherein the resin is provided over the second substrate,
 wherein the resin has a curved upper surface, and
 wherein an insulating film is provided over the thin film transistor and wherein the pixel electrode and the liquid crystal are provided over the insulating film.

39. The liquid crystal display device according to claim 21, wherein the scatterplate comprises acrylic resin.

40. The liquid crystal display device according to claim 38, wherein the scatterplate comprises polycarbonate.

41. The liquid crystal device according to claim 38, wherein the scatterplate has a reflection portion on a side surface.

42. The liquid crystal display device accroding to claim 38, wherein the plurality of LED lamps comprises a uniform arrangement.

43. The liquid crystal display deviceaccording to claim 38, wherein the plural LEDs comprise a red LED, a green LED and a blue LED.

44. The liquid crystal display device according to claim 38, wherein the plural LEDs are plural LED chips.

45. An electronic device comprising the liquid crystal display device according to claim 38, and at least one selected from the group consisting of a speaker, an operation switch, and a recording medium.

46. The liquid crystal display device according to claim 38, wherein the plural LEDs are in direct contact with the second substrate.

47. The liquid crystal display device according to claim 38, wherein the resin is in direct contact with the second substrate.

48. A liquid crystal display device comprising:
 a liquid crystal panel comprising:
  a first substrate;
  a pixel matrix circuit over the first substrate, the pixel matrix circuit comprising:
   a thin film transistor over the first substrate, having a first gate electrode;
   a pixel electrode;
   a signal line, wherein the thin film transistor is electrically connected between the pixel electrode and the signal line; and
   a gate line electrically connected to the first gate electrode; and
  a liquid crystal over the pixel matrix circuit; and
 a backlight adjacent to the liquid crystal panel with a scafferplate interposed therebetween,
 wherein the backlight comprises a plurality of LED lamps,
 wherein each of the plurality of LED lamps comprises an LED and a resin covering the LED,
 wherein the resin has a curved upper surface, wherein the plurality of LED lamps is configured so as to be controlled in accordance with input of image data to the liquid crystal panel, and wherein an insulating film is provided over the thin film transistor and wherein the pixel electrode and the liquid crystal are provided over the insulating film.

49. The liquid crystal display device according to claim 31, wherein the LED is an LED chip.

50. The liquid crystal display device according to claim 48, wherein the scatterplate comprises acrylic resin.

51. The liquid crystal display device according to claim 48, wherein the plurality of LED lamps is configured so as to be controlled to be turned on in synchronism with the input of image data to the liquid crystal panel.

52. An electronic device comprising the liquid crystal display device according to claim 48 and at least one selected from the group consisting of a speaker, an operation switch, and a recording medium.

53. A liquid crystal display device comprising:
  a liquid crystal panel comprising:
    a first substrate;
    a pixel matrix circuit over the first substrate, the pixel matrix circuit comprising:
      a thin film transistor over the first substrate, having a first gate electrode;
      a pixel electrode;
      a signal line, wherein the thin film transistor is electrically connected between the pixel electrode and the signal line; and
      a gate line electrically connected to the first gate electrode; and
    a liquid crystal over the pixel matrix circuit; and
  a backlight adjacent to the liquid crystal panel with a scatterplate interposed therebetween,
  wherein the backlight comprises a plurality of LED lamps,
  wherein each of the plurality of LED lamps comprises an LED and a resin covering the LED,
  wherein the resin has a curved upper surface,
  wherein the liquid crystal is aligned in an optically compensated bend mode, and
  wherein an insulating film is provided over the thin film transistor and wherein the pixel electrode and the liquid crystal are provided over the insulating film.

54. The liquid crystal display device according to claim 53, wherein the LED is an LED chip.

55. The liquid crystal display device according to claim 53, wherein the scatterplate comprises acrylic resin.

56. An electronic device comprising the liquid crystal display device according to claim 53 and at least one selected from the group consisting of a speaker, an operation switch, and a recording medium.

57. A liquid crystal display device comprising:
  a liquid crystal panel comprising:
    a first substrate;
    a pixel matrix circuit over the substrate, the pixel matrix circuit comprising:
      a thin film transistor over the first substrate, having a first gate electrode;
      a pixel electrode;
      a signal line, wherein the thin film transistor is electrically connected between the pixel electrode and the signal line; and
      a gate line electrically connected to the first gate electrode; and
    a liquid crystal over the pixel matrix circuit; and
  a backlight adjacent to the liquid crystal panel with a scatterplate interposed therebetween,
  wherein the backlight comprises a plurality of LED lamps,
  wherein each of the plurality of LED lamps comprises plural LEDs and a resin covering the plural LEDs,
  wherein the resin has a curved upper surface,
  wherein the liquid crystal is aligned in an optical compensated bend mode, and
  wherein an insulating film is provided over the thin film transistor and wherein the pixel electrode and the liquid crystal are provided over the insulating film.

58. The liquid crystal display device according to claim 57, wherein the plural LEDs are plural LED chips.

59. The liquid crystal display device according to claim 57, wherein the plural LEDs comprise a red LED, a green LED, and a blue LED.

60. The liquid crystal display device according to claim 57, wherein the scatterplate comprises acrylic resin.

61. An electronic device comprising the liquid crystal display device according to claim 57 and at least one selected from the group consisting of a speaker, an operation switch, and a recording medium.

* * * * *

UNITED STATES PATENT AND TRADEMARK OFFICE
CERTIFICATE OF CORRECTION

| | |
|---|---|
| PATENT NO. | : 7,916,130 B2 |
| APPLICATION NO. | : 10/989361 |
| DATED | : March 29, 2011 |
| INVENTOR(S) | : Shunpei Yamazaki |

It is certified that error appears in the above-identified patent and that said Letters Patent is hereby corrected as shown below:

At column 6, line 48, "a thin film transistor" should be -- a first thin film transistor --;

At column 6, line 51, "the thin film transistor" should be -- the first thin film transistor --;

At column 6, line 61, "an LED" should be -- plural LEDs --;

At column 8, line 5, "over with the second" should be -- over the second --;

At column 8, line 18, "accoridng" should be -- according --;

At column 9, line 1, "accoridng" should be -- according --;

At column 10, line 25, "accroding" should be -- according --;

At column 9, line 31, "over in contact with" should be -- over --;

At column 9, line 33, "over in contact with" should be -- over --;

At column 10, line 18, "claim 21" should be -- claim 38 --;

At column 10, line 22, "liquid crystal device" should be -- liquid crystal display device --;

At column 10, line 28, "deviceaccording" should be -- device according --;

At column 10, line 34, "claim 38," should be -- claim 38 --;

At column 10, lines 57-58, "scafferplate" should be -- scatterplate --;

At column 11, line 4, "claim 31" should be -- claim 48 --;

Signed and Sealed this
Tenth Day of May, 2011

David J. Kappos
*Director of the United States Patent and Trademark Office*

At column 12, line 10, "over the substrate" should be -- over the first substrate --.

UNITED STATES PATENT AND TRADEMARK OFFICE
CERTIFICATE OF CORRECTION

PATENT NO.       : 7,916,130 B2
APPLICATION NO.  : 10/989361
DATED            : March 29, 2011
INVENTOR(S)      : Shunpei Yamazaki Page 1 of 1

It is certified that error appears in the above-identified patent and that said Letters Patent is hereby corrected as shown below:

On the title page, item (56), under the heading FOREIGN PATENT DOCUMENTS, please remove:

DE 41 32 557 A1    7/1993.

On page 2 of the patent, item (56), under the heading U.S. PATENT DOCUMENTS, please remove the following references:

| | | |
|---|---|---|
| 5,231,265 A     | 7/1993  | McCleer et al. |
| 5,279,292 A     | 1/1994  | Baumann et al. |
| 5,702,431 A     | 12/1997 | Wang et al. |
| 6,597,076 B2    | 7/2003  | Scheible et al. |
| 6,651,999 B1    | 11/2003 | Fischer et al. |
| 2002/0154518 A1 | 10/2002 | Elferich et al. |

Also, on page 2 of the patent, item (56), under the heading FOREIGN PATENT DOCUMENTS, please remove the following references:

| | |
|---|---|
| DE  41 04 359 A1  | 1/1994 |
| DE  196 17 102 A1 | 10/1997 |
| DE  199 15 487 C1 | 11/2000 |
| DE  101 19 283 A1 | 10/2002 |
| DE  199 46 934 A1 | 11/2003 |
| JP  2002-1 98 873 A | 7/2002 |

Signed and Sealed this
Twenty-first Day of June, 2011

David J. Kappos
*Director of the United States Patent and Trademark Office*